United States Patent
Park et al.

[11] Patent Number: 5,872,771
[45] Date of Patent: Feb. 16, 1999

[54] ADAPTIVE CONNECTION ADMISSION CONTROL METHOD USING TRAFFIC MEASUREMENT AND ESTIMATION

[75] Inventors: Hong Shik Park; Dong Yong Kwak; Woo Seop Rhee; Man Yeong Jeon, all of Yuseong-ku, Rep. of Korea

[73] Assignees: Electronics and Telecommunications Research Institute, Daejeon; Korea Telecommunication Authority, Seoul, both of Rep. of Korea

[21] Appl. No.: 582,883

[22] Filed: Jan. 4, 1996

[30] Foreign Application Priority Data

Aug. 17, 1995 [KR] Rep. of Korea ................. 1995-25319

[51] Int. Cl.⁶ .................... G01R 31/08; G06F 11/00; G08C 15/00
[52] U.S. Cl. ................... 370/252; 370/230; 370/234
[58] Field of Search .................... 370/252, 253, 370/230, 232, 233, 234

[56] References Cited

U.S. PATENT DOCUMENTS

| | | | |
|---|---|---|---|
| 4,984,264 | 1/1991 | Katsube | 370/233 |
| 5,166,894 | 11/1992 | Saito | 370/252 |
| 5,315,586 | 5/1994 | Charvillat . | |
| 5,341,366 | 8/1994 | Soumiya et al. | 370/234 |
| 5,412,642 | 5/1995 | Nunokawa | 370/253 |
| 5,581,544 | 12/1996 | Hanada et al. | 370/253 |
| 5,583,857 | 12/1996 | Soumiya et al. | 370/233 |

OTHER PUBLICATIONS

"Connection Admission Control in ATM Networks" Esaki et al., IEICE Trans. Commun. vol. E77–B, No. 1, Jan. 1994.

*Primary Examiner*—Chi H. Pham
*Assistant Examiner*—Steven Nguyen
*Attorney, Agent, or Firm*—Venable; Robert J. Frank; Allen Wood

[57] ABSTRACT

Disclosed is an adaptive connection admission control method by traffic measurement and estimation, which includes the steps of determining whether a connection is to be accepted or not by using the peak cell rate among the user-declared traffic parameters and the estimation value of the average cell rate of individual connections under service as inputs when a connection set-up request signal is inputted into the system, the step of reducing the number of connections when a connection release request signal is inputted, and the step of calculating the measured value of the average cell rate of all the connections passing through an output link and the estimated value of the average cell rate of individual connections when the measuring interval has ended, to thereby accomplish accurate and smooth connection controls.

5 Claims, 3 Drawing Sheets

ADAPTIVE CONNECTION ADMISSION CONTROL METHOD USING TRAFFIC MEASUREMENT AND ESTIMATION

BACKGROUND OF THE INVENTION

1. Field of the Invention

The present invention relates to a an adaptive connection admission control method using measurement and estimation of traffic in active service.

2. Description of the Prior Art

In a conventional Asynchronous Transfer Mode (ATM) network, congestion of the network may occur due to an unexpected traffic change of broad-band traffic, and thus a powerful and reliable traffic control mechanism for overcoming such problems is needed in an ATM system. A connection admission control system is used as a traffic control mechanism and determines whether a user's connection demand is accepted or not. A new connection is made only when a sufficient bandwidth is provided to such an extent that a quality of service (QoS) of the new connection can be guaranteed without lowering the QoS of existing services.

Conventional connection admission control methods are classified into two types. One is a method based upon a traffic parameter defined by a user, and the other is grounded on a measurement.

Generally speaking, as traffic parameters, representing a characteristic of a broad-band traffic, a peak cell rate and an average cell transmitting rate are used. The peak cell rate is readily defined as the reciprocal of the minimum interval between cells, but it is difficult to get an accurate average cell rate in advance because of its statistical characteristics.

Accordingly, the connection admission control method based upon a traffic parameter defined by a user is not accurate, and the efficiency of utilization of the bandwidth is conspicuously reduced if the traffic parameter is set inappropriately. Furthermore, in the case of the connection admission control method by a measurement, the traffic changes statistically and it is very difficult to set the measuring period of the measuring mechanism and the associated hardware, and therefore the measurement is hard to make accurately.

SUMMARY OF THE INVENTION

Therefore, it is an object of the present invention to provide an adaptive connection admission control method using a declared peak cell rate and the average cell rate is calculated through a measuring and estimating mechanism so that an accurate and smooth connection admission control can be made.

To accomplish the object of the present invention, an adaptive connection admission control method in an Asynchronous Transfer Mode switching system comprises a step of determining whether a connection is to be accepted or not by using a peak cell rate among user-defining traffic parameters and an estimation value of an average cell rate of individual connections in service as inputs when a connection request signal is inputted into the system; a step for reducing the number of connections when a connection release request signal is inputted; and a step for calculating a measured value of the average cell rate of all connections passing through output links and an estimated value of the average cell rate of individual connections when the measuring interval has ended.

DESCRIPTION OF THE PREFERRED EMBODIMENT

An embodiment according to the present invention will be described in detail with reference to the accompanying drawings.

Figure 1:
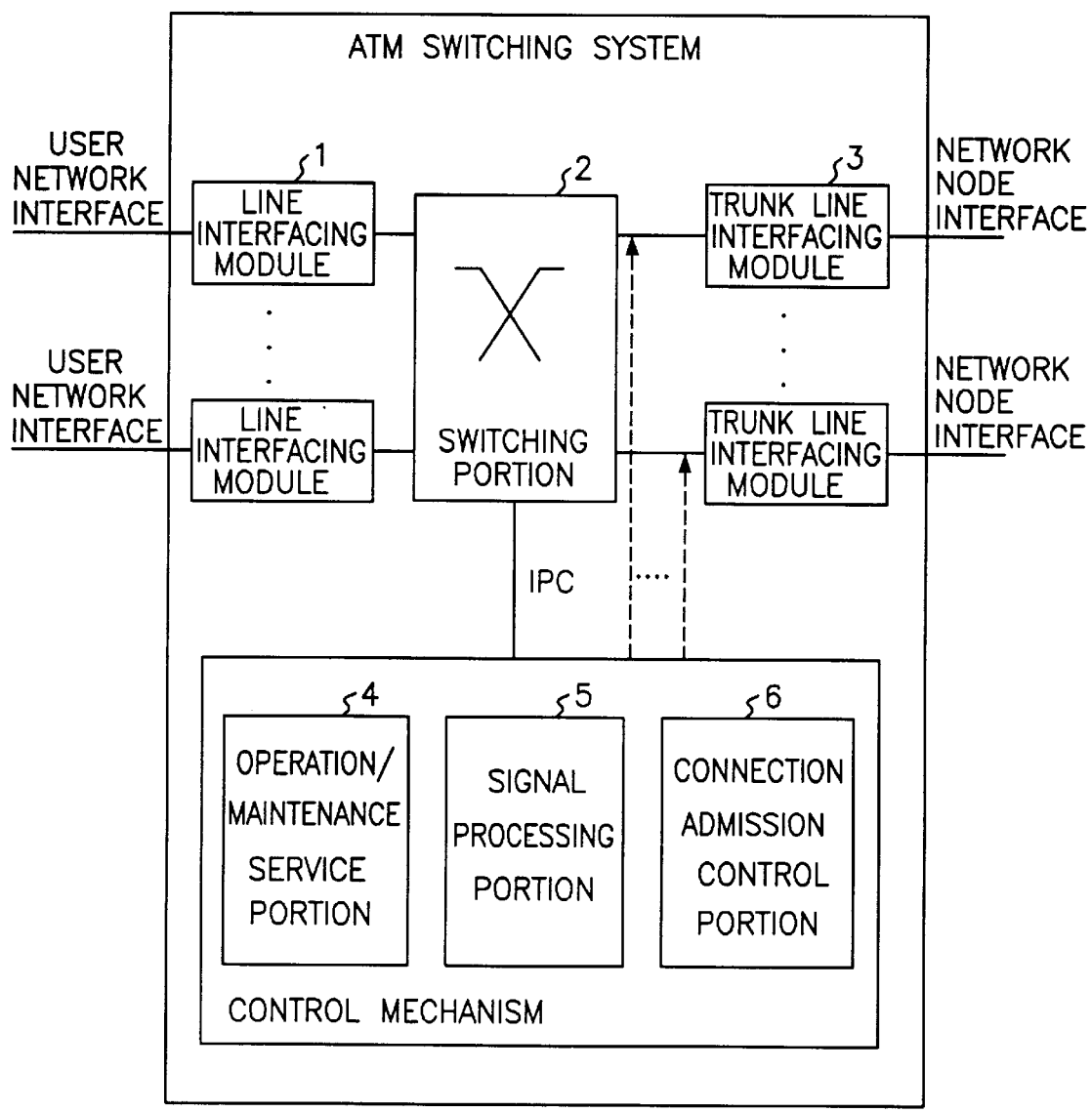
FIG. 1 is a block diagram showing an Asynchronous Transfer Mode switching system according to an embodiment of the present invention.

FIG. 1 is a block diagram for showing an Asynchronous Transfer Mode switching system according to an embodiment of the present invention. As shown in FIG. 1, reference numerals 1 through 6 indicate a line interfacing module, a switching portion, a trunk line interfacing module, an operation/maintenance service portion, a signal processing portion and a connection admission control portion, respectively.

The line interfacing module 1 has the function of connecting the user with the network and the trunk line interfacing module 3 interfaces the ATM switching system to a counterpart network. The switching portion 2 switches the cells to modules connected to the switching portion 2 by use of a routing tag attached to each of the cells. The operation/maintenance service portion 4 gathers status information about the ATM system and periodically provides a network manager with the information. The signal processing portion 5 processes signals related to a connection set-up and a connection release. The connection admission control portion 6 determines whether a connection request will be accepted or not, and periodically measures and estimates cells passing through the switch.

Figure 2:
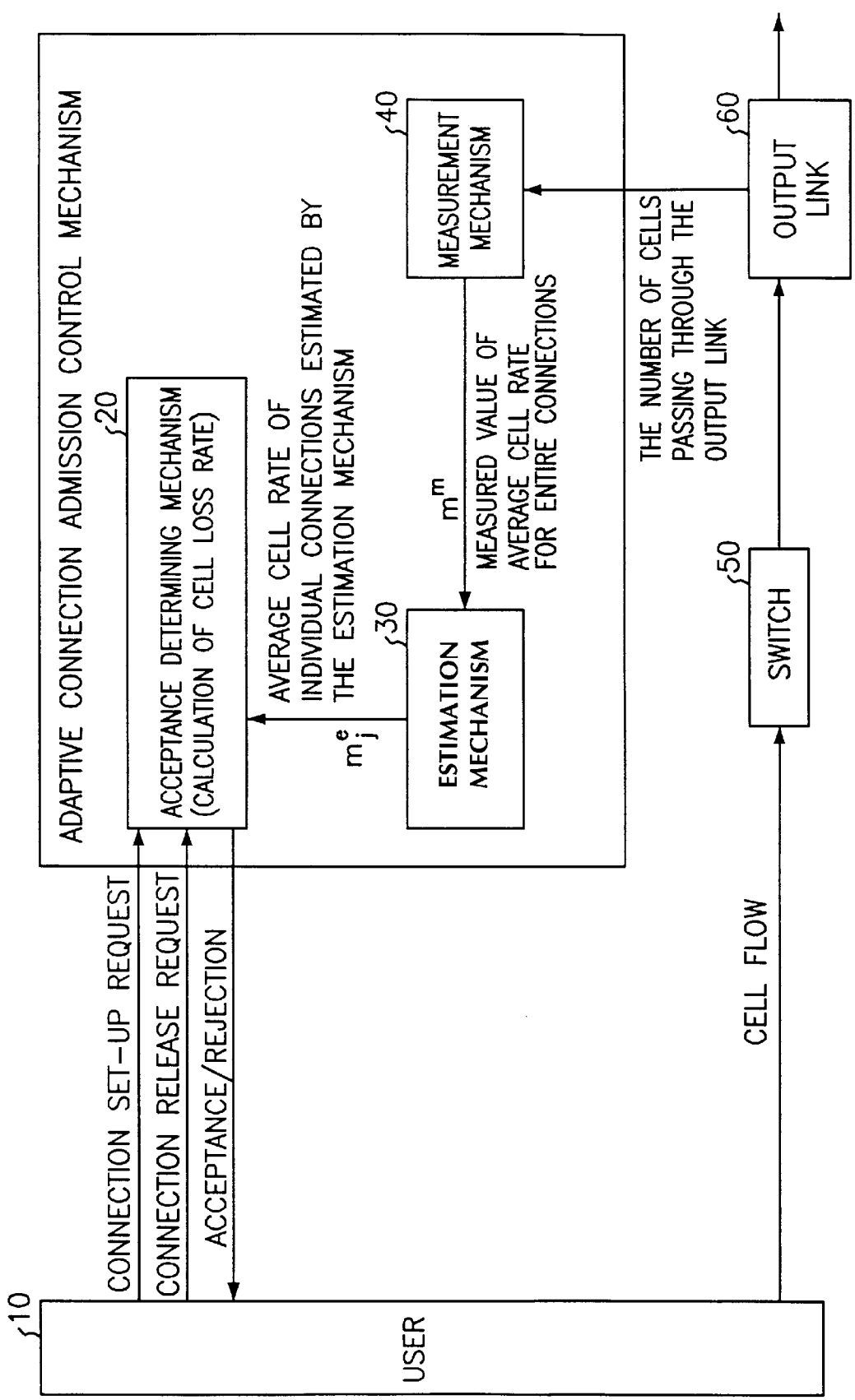
FIG. 2 is a block diagram schematically showing an adaptive connection admission control system using traffic measurement and estimation according to an embodiment of the present invention.

FIG. 2 is a block diagram for schematically showing an adaptive connection admission control system using traffic measurement and estimation according to an embodiment of the present invention. As shown in FIG. 2, the block diagram comprises users 10 which can request a connection set-up and a connection release, a measuring mechanism 40 for counting the number of cells passing through a switch 50 in the unit of a measuring interval and for measuring an average cell rate with respect to the entirety of the connections in the unit of an output link 60, an estimating mechanism 30 for estimating an average cell rate of individual connections with input of the entire average cell rate measured in measuring mechanism 40, and a connection admission control determining mechanism 20 for determining whether a connection is accepted or not with input of the average cell rate of individual connections obtained by estimating mechanism 30, a user-defined traffic parameter and the target cell loss rate.

Figure 3:
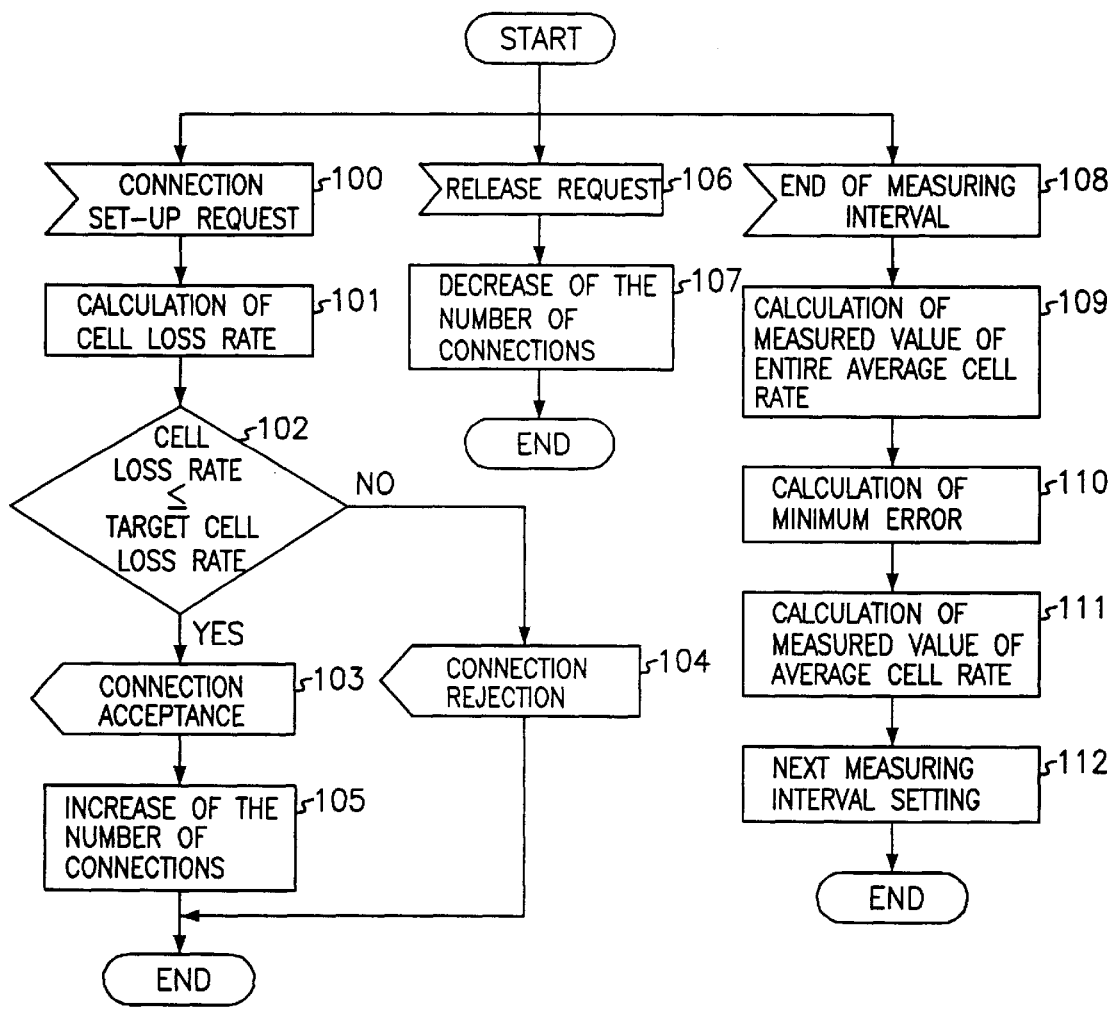
FIG. 3 is a flow chart explaining the method of FIG. 2.

FIG. 3 is a flow chart for explaining the method of FIG. 2. For understanding the flow chart the variables are defined as below:

$P^d_{max}$: maximum peak cell rate among multiplexed connections

T: the reciprocal of $P^d_{max}$

M: the maximum number of cells able to be transmitted by an output link for a time period T L: the number of service types $N_i$: the number of connections in service type i V: the transmission rate of the output link p: the average load imposed on the output link $P^d_{N+1}$: the declared maximum peak cell rate of an (N+1)th connection $m^d_{N+1}$: the defined average cell rate of the (N+1)th connection $P^e(k)$: probability in which K cells are transmitted from multiplexed connections for the time period T $m^e_j$: the estimated average cell rate of service type j $m^m$: the measured value of the average cell transmitting rate in respect of the entirety of the connections in service CLR: the cell loss rate $a_i(n)$: the weighted value of an average cell rate defined by the i-th connection The numerical formulas in accordance with an embodiment of the present invention are as follows:

$$\rho = \sum_{j=1}^{L} N_j m_j^e / V \quad (1)$$

$$P^e(k) = \sum_{k = \sum_{i=1}^{L} n_i} \prod_{j=1}^{L} \begin{bmatrix} N_j \\ n_j \end{bmatrix} a_j^{n_j} (1-a_j)^{N_j - n_j} \quad (2)$$

$$a_j = m_j^e / P^d_{max} \quad (3)$$

$$CLR = \frac{1}{\rho' M} \sum_{k=0}^{M} (M-k) P'(k) - \frac{1-\rho'}{\rho'} \quad (4)$$

wherein, $$P'(k) = \begin{cases} (1 - a_{N+1}) P^e(0) & k = 0 \\ (1 - a_{N+1}) P^e(k) + a_{N+1} P^e(k-1) & k \neq 0 \end{cases} \quad (5)$$

$$a_{N+1} = P^d_{N+1} / P^d_{max}$$

$$\rho' = \rho + P^d_{N+1} / V$$

$$e^2(n) = \left[ m^m(n) - \sum_{i=1}^{N} a_i(n) m_i^d \right]^2, N = \sum_{j=1}^{L} N_j$$

$$m_i^e = a_i m_i^d \quad (6)$$

In formula (5), e means the error between the measured value of the average cell rate for the entirety of the connections and a calculated value using an estimation formula for the average cell rate of the entire connections $$\left( \sum_{i=1}^{N} a_i(n) m_i^d \right);$$

n, means the number of repetitions of calculation made while finding a minimum value of a squared error $[e^2(n)]$ by means of the steepest descent method; and $a_i$, a coefficient found in the estimating mechanism, indicates a weighted value of the average cell rate declared by the i-th connection. Formula (6) is given in order to obtain the estimated value of the average cell-transmitting rate for each of the connections in which the estimation is made by multiplying the weighted value of $a_i$ of the i-th connection obtained when the error of formula (5) converges to a certain value.

The (N+1)th user requests a connection with the peak cell rate ($P^d_{N+1}$) of a connection and the target cell loss rate representing the quality of the service (step 100). In the process of the connection admission control, the cell loss rate is obtained by formula (4) (step 101). If the cell loss rate, calculated as mentioned above, is smaller than the target cell loss rate, demanded by the (N+1)th connection, the connection is accepted, the user is informed of the acceptance and the number of connections under service increases (steps 102, 103, and 105). If the cell loss rate calculated in formula (4) is larger than the target cell loss rate requested by the (N+1)th connection, the connection is rejected and the user is informed of the rejection (steps 102 and 104).

When a user requests a connection release, only one of the connections under service is reduced (steps 106 and 107).

If the measuring interval has ended, with respect to all of the connections under service, which have been measured during the measuring interval, the average cell rate is calculated (steps 108 and 109). By using the measured value of the entire average cell rate as an input, the minimum value of the error is calculated by means of the steepest descent algorithm of formula (5) (step 110). The estimated value of the average cell rate for the i-th connection is estimated by multiplying the weighted valued of the i-th connection obtained when the calculated error converges to a certain value $a_i(n)$ by the declared average cell rate of the i-th connection $m_i^d$, i.e., [formula (6)] (step 111).

And finally, the next measuring interval starts (step 112). According to the present invention described in the foregoing, the efficiency of the bandwidth utilization is improved through the measurement and estimation of the actual traffic under service, and an accurate and smooth operation is possible in spite of the traffic changes in the system.

What is claimed is:

1. An adaptive connection admission control method in an Asynchronous Transfer Mode (ATM) switching system, comprising steps of:

determining whether a connection is to be accepted or not by using a peak cell rate among user-declared traffic parameters and an estimation value of an average cell rate of individual connections under service as inputs when a connection set-up request signal is inputted to the system;

reducing the number of connections when a connection release request signal is inputted; and calculating the measured value of the average cell-transmitting rate of all connections passing through an output link and an estimated value of the average cell rate of individual connections when a measuring interval has ended, wherein the calculation step includes a step for calculating the measured value of the entire average cell rate with respect to connections measured during the measuring interval if the measuring interval has ended;

a step for minimizing an error by using the measured value of the entire average cell rate as an input; and a step for calculating the estimated value of the average cell rate for individual connections and for setting the next measuring interval.

2. The method as claimed in claim 4, wherein the determination step includes a step for calculating a cell loss rate by using the estimated value of the average cell rate for existing connections under service and a peak cell rate of the current requested connection if a user demands a connection with a peak cell rate ($P^d_{N+1}$) of a connection and a target cell loss rate representing the quality of the service and for comparing the target cell loss rate with the calculated cell loss rate;

a step for accepting a connection if the target cell loss rate is not less than the calculated cell loss rate; and a step for rejecting a connection if the target cell loss rate is less than the calculated cell loss rate.

3. The method as claimed in claim 1, wherein the estimated value of the average cell rate is obtained by multiplying a weighted value $\{a_i\}$ of an i-th connection obtained when the error converges to a predetermined value by the declared average cell rate of the i-th connection.

4. The method as claimed in claim 2, wherein the calculated cell loss rate is calculated by means of the formula $$\frac{1}{\rho' M} \sum_{k=0}^{m} (M-k)P'(k) - \frac{1-\rho'}{\rho'}$$

where, $\rho' = \rho + P^d_{N+1}/V,$ $$P'(k) = \begin{cases} (1 - a_{N+1})P^e(0) & k = 0 \\ (1 - a_{N+1})P^e(k) + a_{N+1}P^e(k-1) & k \neq 0, \\ a_{N+1} = P^d_{N+1}/P^d_{max}, \end{cases}$$

$P^e(k)$: probability in which K cells are transmitted from multiplexed connections for the time period T, $P^d_{max}$: maximum peak cell rate among multiplexed connections, $P^d_{N+1}$: the declared maximum peak cell rate of (N+1)th connection, V: a transmission rate of output link p: average load imposed on the output link, and M: the maximum number of cells able to be transmitted by an output link for a time period T.

5. The method as claimed in claim 1, wherein the error (e) of the minimization step is calculated by means of the formula $$e^2(n) = \left[ m^m(n) - \sum_{i=1}^{N} a_i(n)m_i^d \right]^2 \left( \text{provided that, } N = \sum_{j=1}^{L} N_j \right), \text{where}$$

$m^e_j$: the estimated average cell rate of service type j, $m^m$: measured value of the average cell transmitting rate in respect of the entire connections in service, $a_i(n)$: the weighted value of an average cell rate defined by an i-th connection, $N_i$: the number of connections in service type i, and L: the number of service types.

* * * * *